United States Patent Office 2,715,643
Patented Aug. 16, 1955

2,715,643

PROCESS FOR PREPARING N-[2'-(4"-CHLORO-2"-SULFOPHENOXY) - 5'- CHLOROPHENYL]-N'-[3,4-DICHLOROPHENYL]-UREA

Henry Martin, Feuerthalen (Schaffhausen), Switzerland, assignor to Variapat A. G., Basel, Switzerland No Drawing. Application December 22, 1951, Serial No. 263,025

Claims priority, application Switzerland December 26, 1950

5 Claims. (Cl. 260—506)

N - [2' - (4" - chloro - 2" - sulfophenoxy) - 5' - chlorophenyl]-N'-[3,4-dichlorophenyl]-urea is a known compound having the formula:

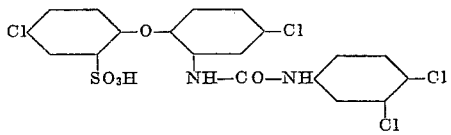

It has been largely used as moth-proofing agent and is prepared by condensation of 2-amino-4,4'-dichloro-1,1'-diphenylether-2'-sulfonic acid with 3,4-dichlorophenyl-isocyanate in anhydrous pyridine (see Swiss Patent No. 215,328). In the industrial preparation of said substance one starts with the sodium salt instead of the free sulfonic acid, condenses in nitrobenzene and precipitates with brine. By all these processes the carbamide derivative is obtained in its difficultly soluble form.

It has now been found that said carbamide derivative can be obtained in a form which is very readily soluble in water if a salt, for example the sodium salt of 2-amino-4,4'-dichloro-1,1'-diphenylether-2'-sulfonic acid and 3,4-dichloro-phenyl-isocyanate are condensed in anhydrous acetonitrile. This result could by no ways be expected and was very surprising. By the process according to the invention an anhydrous product is obtained which is soluble in warm water in a proportion of about 1:2. After standing the less soluble form crystallises out and the readily soluble form remains in solution. This readily soluble form of N-[2'-(4"-chloro-2"-sulfophenoxy)-5'-chlorophenyl]-N'[3,4-dichlorophenyl]-urea is of technical interest. With regard to the danger of hydrolysis during the dissolution and application for the dye bath it is of extreme importance to bring said urea quickly and completely into solution. If the urea is boiled for any extended period of time it is hydrolized to amines which have objectionable influences on the color of textile material. This involves not only a saving of time and heating costs, but also a saving of material due to the fact that the dissolution in water can be performed without partial hydrolysis of the condensation product.

The working in acetonitrile does not only have an advantageous effect on the application of the product but also on its preparation. At the time in the preparation of one of the components of the condensation, namely the 2 - amino-4,4'-dichloro-1,1'-diphenylether-2'-sulfonic acid, there is used a p-chloro-phenol which is not completely free of o-chlorophenol, there is obtained by condensation with p-dichloronitrobenzene, subsequent reduction and sulfonation besides 2-amino-4',4-dichloro-1,1'-diphenylether-2'-sulfonic acid the 2-amino-2',4-dichloro-1,1' - diphenylether - 4'-sulfonic acid. When condensed with 3,4-dichlorophenylisocyanate the latter forms a condensation product which has little efficiency and is difficultly soluble in water. In the commercial preparation of the moth-proofing agent this isomer compound which is difficultly soluble in water is normally contained in the end product as an impurity. This deteriorates the end product to a substantial extent and gives rise to the danger of hydrolysation when dissolving and dyeing the product.

In the present said isomer compound before condensation in acetonitrile crystallises out, whereas the main product remains in solution. The byproduct is removed by filtration from the reaction mixture. Thus also when using technical pure chlorophenol one will obtain a uniform product of condensation which is readily soluble in water.

When the reaction has reached its end the acetonitrile is distilled off in vacuum, condensed and may then be recycled to the next batch. Thus my process produces, after filtration, the same water soluble mothproofing agent in substantially pure form, from 2-amino-4,4'-dichloro-1,1'-diphenyl ether-2' sulfonic acid contaminated with 2-amino-2,4-dichloro-1,1'-diphenyl ether-4 sulfonic acid as when the former acid is substantially pure because, as pointed out above, the latter, before condensation in acetonitrile separates out while the former remains in solution and the latter is removed by filtration.

*Example*

17.8 parts by weight of well dried sodium salt of 2-amino-4,4'-dichloro-1,1'-diphenylether-2'-sulfonic acid are dissolved in 200 parts by vol. of anhydrous acetonitrile and admixed with the equivalent amount of 3,4-dichlorophenylisocyanate. After heating on a waterbath the mixture is cooled, if need be filtered, admixed with animal charcoal and filtered. The solvent is distilled off in vacuum whereby the condensation product freezes with swelling up. It forms a clear solution with only a small amount of water. From this aqueous solution the more difficultly soluble modification crystallises out.

I claim:

1. In a process for preparing N-[-2'-(4"-chloro-2"-sulfophenoxy) - 5' - chlorophenyl] - N' - [3,4 - dichlorophenyl]-urea, in a readily soluble form the step of condensing a salt of 2-amino-4,4'-dichloro-1,1'-diphenylether-2'-sulfonic acid with 3,4-dichlorophenylisocyanate, in anhydrous acetonitrile.

2. Process according to claim 1, characterized by the fact that an alkali-metal salt of the sulfonic acid is used.

3. Process according to claim 2, characterized by the fact that a mixture of isomeric 2-aminodichloro-1,1'-diphenylether-sulfonic acid salts is used.

4. In a process for preparing N-[-2'-(4"-chloro-2"-sulfophenoxy) - 5' - chlorophenyl] - N' - [3,4 - dichlorophenyl]-urea the step of condensing 3,4-dichlorophenylisocyanate with a salt of 2-amino-4,4'-dichloro-1,1'-diphenylether-2'-sulfonic acid contaminated with 2-amino-2,4-dichloro-1,1'-diphenylether-4-sulfonic acid in anhydrous acetonitrile, crystallizing out the more difficultly soluble modification from the solution, and recovering the readily soluble form by evaporation of the solvent.

5. A process for purifying 2-amino-4,4'-dichloro-1,1'-diphenylether-2' sulfonic acid salt contaminated with 2-amino-2',4-dichloro-1,1'-diphenylether-4-sulfonic acid salt of the same metal comprising subjecting the contaminated salt to the solvent action of anhydrous acetonitrile and crystallizing the impurity therefrom, leaving in the acetonitrile a higher ratio of the first mentioned compound relative to the isomer.

References Cited in the file of this patent

UNITED STATES PATENTS 2,311,062   Martin et al. _____ Feb. 16, 1943

FOREIGN PATENTS 215,328   Switzerland _____ Sept. 16, 1941